UNITED STATES PATENT OFFICE.

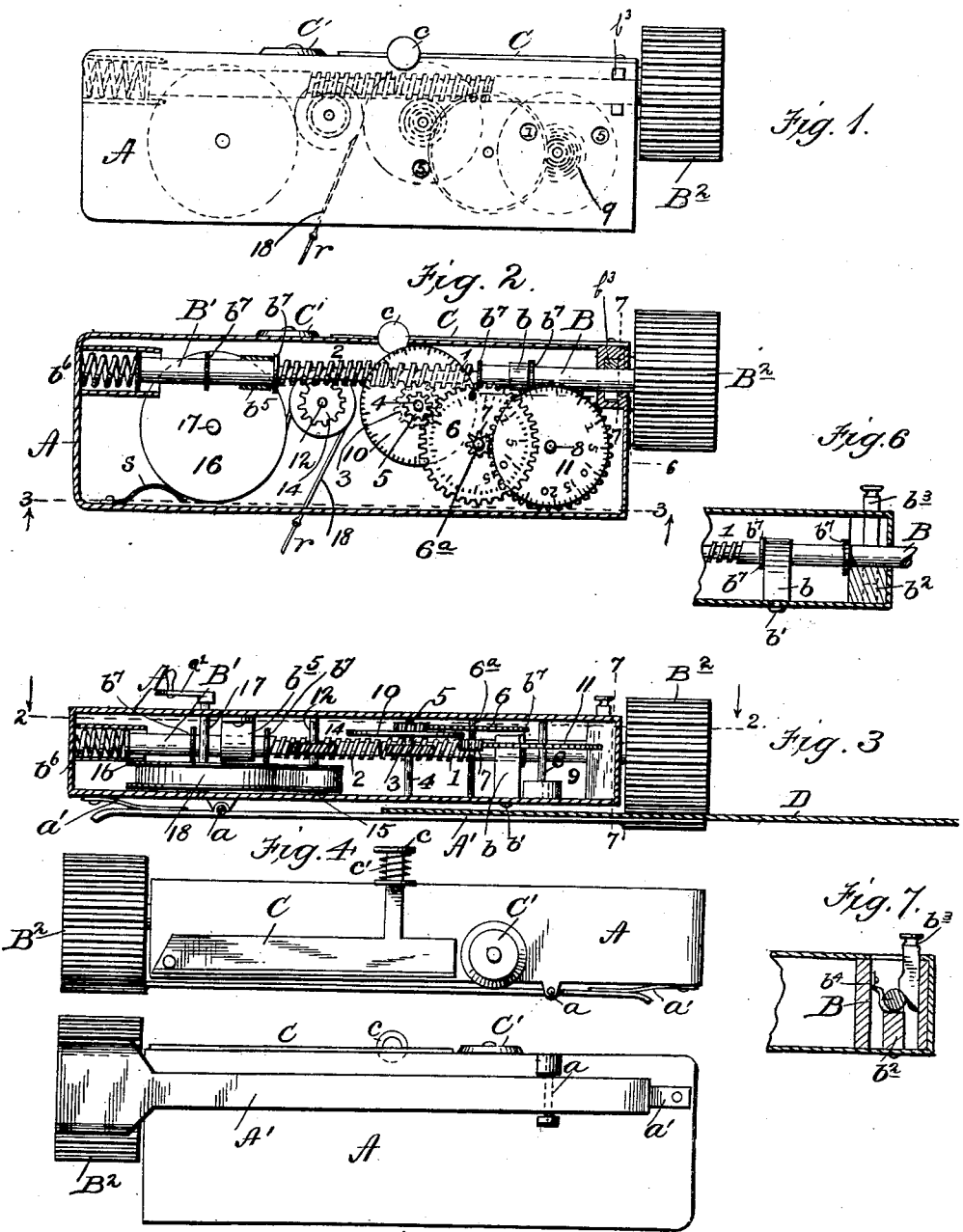

WILLIS W. FRANTZ, OF WAYNESBORO, PENNSYLVANIA.

MEASURING DEVICE.

SPECIFICATION forming part of Letters Patent No. 677,074, dated June 25, 1901.

Application filed May 13, 1899. Serial No. 716,688. (No model.)

*To all whom it may concern:*

Be it known that I, WILLIS W. FRANTZ, a citizen of the United States, residing at Waynesboro, in the county of Franklin and State of Pennsylvania, have invented certain new and useful Improvements in Measuring Devices, of which the following is a specification.

The object of my said invention is to provide an instrument for measuring fabric and such articles which can be held in the hand and run over the edge thereof and will register the length as the operation proceeds and be accurate, convenient, and inexpensive; and I accomplish said object by the combination and arrangement of parts hereinafter described and claimed.

Referring to the accompanying drawings, which are made a part hereof, and on which similar characters of reference indicate similar parts, Figure 1 is a top or plan view of one of said devices ready for use; Fig. 2, a horizontal section through the same on the dotted line 2 2 in Fig. 3; Fig. 3, a longitudinal vertical section on the dotted line 3 3 in Fig. 2; Fig. 4, a rear side elevation; Fig. 5, an under side plan; Fig. 6, a detail section on the dotted line 6 6 in Fig. 2, and Fig. 7 a detail section on the dotted line 7 7 in Fig. 2.

In said drawings the portions marked A represent the casing or frame of the device; B B', the operating-shafts; C, a pivoted cutter for severing the fabric at its edge; C', a rotary cutter for completing the severing operation, and D the fabric to be operated upon.

The casing or frame is of a form suitable to accommodate the mechanism employed and is adapted to be used as the handle by which the device is held and operated or pushed over the edge of the stuff being measured. It may be of metal or any approved construction. It is provided with bearings and supports for the various parts of the device and has a spring presser-arm $A'$ hinged to its under side on a pintle $a$, a spring $a'$ being mounted under its outer end to normally hold its opposite end pressed upwardly, as will be presently described.

The shaft B is mounted to rotate and slide in a bearing $b$, which bearing is secured to the bottom of the casing by a vertical pivot $b'$. Said bearing is located some distance inside the casing, and near or at the end of said casing said shaft rests upon a block $b^2$ and between a vertically-sliding wedge $b^3$ and a spring $b^4$, both formed to support said shaft and provide for its adjustment sidewise at this point, for a purpose to be presently described. Said shaft projects to outside of casing and has a wheel $B^2$ mounted thereon to revolve therewith. Said wheel is provided with a frictional surface on its periphery, which extends slightly below the lower surface of the casing. The presser-arm $A'$ is held against its under side by the spring $a'$. The shaft $B'$ is mounted in a bearing $b^5$ in the other end of the casing in line with shaft B and abutting it. Behind said shaft $B'$ is mounted a spring $b^6$, which normally tends to push said shaft toward shaft B. Collars or stops $b^7$ are provided on each shaft on each side of the bearings $b$ and $b^5$ to limit the longitudinal movement of said shafts. Each of said shafts is provided with a worm-gear 1 and 2, respectively, on its inner end. The worm 1 on shaft B is adapted to engage with a toothed gear-wheel 3, mounted on a vertical shaft 4. Another toothed wheel 5, smaller in diameter and mounted on the same shaft, engages with a toothed wheel 6 of larger diameter on an intermediate shaft $6^a$. Another toothed wheel of smaller diameter is mounted on said intermediate shaft and engages with a toothed wheel 11 on a vertical shaft 8. A coiled spring 9, with one end secured to said shaft and the other to the casing, is mounted on shaft 8 to automatically reverse its position after operation. A disk 10, with graduation-marks and scale-numbers around its edge, is mounted on shaft 4, and the wheels 6 and 11 are similarly formed. The scale and numbers of wheel 10 are made to designate inches, those on wheel 6 to designate feet, and those on wheel 11 to designate yards, and the gearing is so arranged as to relative proportions and sizes that the motion of the periphery of wheel $B^2$ will be measured by said wheels or dials in inches, feet, and yards (or any other units of measure desired) and the figures representing the measurements will show through apertures left in the top of the casing for the purpose, as indicated in Fig. 1.

Adjacent to shaft 4 is another vertical shaft 12, having a toothed wheel 14 thereon, which engages the worm 2 on shaft B'. An idler-pulley 15 is also mounted on said shaft, and a spool 16 is mounted on another shaft 17, located near it. On said spool 16 is mounted a tape or cord 18, the end of which passes over the idler 15 and out through an aperture in the side of the casing, being provided with a ring $r$ or other convenient device for a pull. A spring-brake $s$, Fig. 2, bears against the periphery of said spool and prevents it from turning except as operated by force, and a crank $a^2$ (or any suitable means) is mounted on the shaft of said spool for the purpose of winding it after being unwound, as will be readily understood.

My said invention is used as follows: It being desired to measure a certain quantity of cloth or other fabric or flexible article, as D, the instrument is taken in the hand, the presser-arm A' thrown away from the surface of the friction-wheel $B^2$ by pressing on its outer end with the finger, and said wheel is placed on the edge of the article and said presser-arm allowed to spring back to clamp and hold it against said wheel. The fabric is held by one hand and the instrument pushed along over said edge by the other hand, in which said instrument is held. The spring under the outer end of the presser-arm will hold the fabric to the surface of wheel $B^2$ with sufficient force to produce the friction necessary to operate it in most kinds of fabric; but if additional pressure is required, as in the case of very smooth fabric, such as silk or satin, it can be supplied by pressure from the fingers grasping the instrument, which are in front of the pivot of the presser-arm, or the pressure can be relieved, if desired, for any purpose by pressure from the finger behind said pivot. The friction operates to turn the wheel $B^2$ and the shaft B, on which it is mounted, operating through the train of gear above described the indicating-disks. When the desired quantity has been measured, it will be indicated by the figures showing through the apertures in the casing, as indicated in Fig. 1. The movement is then stopped and the operator presses down on the handle $c$ on the cutter C, which operates to cut a notch in the edge of the cloth at just the point which marks the measurement. By pressing upward on the end of arm A', just beneath spring $a'$, the other end of said arm is thrown down to free the fabric from the instrument, which is then pushed across said fabric, the rotary cutter C' operating to continue the cut started by the cutter C until the entire breadth is severed. The fabric is thus quickly measured and with greater accuracy than by the usual method and conveniently cut at just the exact point desired. When the operation is completed, the inner end of the shaft B is swung away from the gear-wheel 3 sufficiently to free its worm therefrom by forcing down the wedge $b^3$ to swing said shaft on the pivot $b'$ in the desired direction, and the spring 9 operates to automatically return the disks and mechanism to the first position. When it is desired to use the tape 18, the shaft B is thrown out of engagement with the gear-wheel 3, when the spring $b^6$ will operate to push the shaft B' forward, pushing the shaft B out until the collars $b^7$ strike the bearings, when the worm 2 on said shaft will have come into engagement with the gear-wheel 3. By drawing the tape or cord 18 out over the idler 15 the shaft 12 and gear-wheel 14 thereon are revolved, which operates to drive said shaft B' and through it the gear-wheel 3 and the train of gearing connected therewith, operating the indicating-disks, as before described. Thus the end $r$ can be secured or held at a point from which it is desired to measure a distance and the instrument carried to the other point, when the distance between the two will be indicated in plain figures on the face of the instrument. The brake $s$ will prevent the spool from unwinding except when force is applied, and the crank $a^2$ (or other suitable mechanism) furnishes a convenient means for winding up the tape after it has been unwound.

Having thus fully described my said invention, what I claim as new, and desire to secure by Letters Patent, is—

1. In a measuring instrument, the combination, of the casing formed to inclose the mechanism and serve as the handle by which the instrument is operated, indicating-dials therein beneath apertures in said casing, said dials and dial-shafts geared together, an operating-shaft geared thereto and extending to the outside, a friction-wheel on its outer end, a presser-arm for holding the stuff to said wheel mounted on the casing in position to be grasped and its tension regulated by the hand holding the instrument, substantially as set forth.

2. The combination, in a measuring device, of a casing, the indicating mechanism, the operating-shafts, the gearing connecting the same and the indicating mechanism, the friction-wheel, and the presser for holding the stuff to be measured to said wheel, and the severing device secured in a fixed position on said casing to be operated by the movement of the whole measuring device across the cloth, substantially as set forth.

3. The combination, in a measuring instrument, of the casing, the indicating devices, the operating mechanism, the shaft B mounted to slide in a pivoted bearing, the holding and adjusting devices for said shaft, the shaft B' mounted to slide on said shaft B, and provided with a gear which engages with the mechanism for operating the indicating devices when it is slid forward, the gear for operating said shaft, the idler on the same shaft with said gear, and the spool containing tape which runs over said idler, all substantially as described and for the purpose specified.

4. In a measuring device, the combination of the casing, the indicating mechanism, the two-part shaft one part arranged to be operated by a friction-wheel running over stuff to be measured and the other by a tape running over an idler, said shaft being provided on each part with a gear and mounted to be adjusted to bring one or the other of said gears into engagement to operate the indicating mechanism, substantially as set forth.

In witness whereof I have hereunto set my hand and seal at Waynesboro, Pennsylvania, this 9th day of May, A. D. 1899.

WILLIS W. FRANTZ. [L. S.]

Witnesses:
 S. A. CLEVENGER,
 GUY E. ELDON.